United States Patent
Karamanian et al.

(10) Patent No.: US 7,688,214 B1
(45) Date of Patent: *Mar. 30, 2010

(54) WEATHER WARNING SYSTEM AND METHOD

(75) Inventors: Ara A. Karamanian, Northridge, CA (US); Andre A. Karamanian, Durham, NC (US); Kenneth C. Land, Hillsborough, NC (US)

(73) Assignee: Strategic Design Federation W, Inc. (VG)

( * ) Notice: Subject to any disclaimer, the term of this patent is extended or adjusted under 35 U.S.C. 154(b) by 97 days.

This patent is subject to a terminal disclaimer.

(21) Appl. No.: 12/174,111

(22) Filed: Jul. 16, 2008

Related U.S. Application Data

(63) Continuation of application No. 11/588,629, filed on Oct. 27, 2006, now Pat. No. 7,411,513, which is a continuation of application No. 10/131,281, filed on Apr. 22, 2002, now Pat. No. 7,202,795.

(51) Int. Cl.
*G01W 1/00* (2006.01)
(52) U.S. Cl. .................................... 340/601
(58) Field of Classification Search ................ 340/601, 340/692, 686.6, 600, 540; 324/344; 702/2, 702/15
See application file for complete search history.

(56) References Cited

U.S. PATENT DOCUMENTS

| | | | |
|---|---|---|---|
| 4,023,408 A | 5/1977 | Ryan et al. | |
| 4,408,196 A | 10/1983 | Freeman | |
| 4,649,524 A | 3/1987 | Vance | |
| 4,684,951 A | 8/1987 | Baumer | |
| 4,801,942 A | 1/1989 | Markson | |
| 4,812,825 A * | 3/1989 | Kennedy et al. | 340/601 |
| 4,996,473 A | 2/1991 | Markson | |
| 5,245,274 A | 9/1993 | Youngquist | |
| 5,281,815 A | 1/1994 | Even-Tov | |
| 5,396,220 A | 3/1995 | Markson | |
| 5,490,062 A | 2/1996 | Leach et al. | |
| 5,771,020 A | 6/1998 | Markson | |
| 5,910,763 A | 6/1999 | Flanagan | |
| 6,181,258 B1 | 1/2001 | Summers et al. | |
| 6,232,882 B1 | 5/2001 | Hed et al. | |
| 6,603,405 B2 * | 8/2003 | Smith | 340/905 |
| 6,646,559 B2 | 11/2003 | Smith | |
| 6,751,580 B1 | 6/2004 | Cope et al. | |
| 7,202,795 B2 * | 4/2007 | Karamanian et al. | 340/601 |
| 2002/0067289 A1 * | 6/2002 | Smith | 340/905 |

* cited by examiner

*Primary Examiner*—Phung Nguyen
(74) *Attorney, Agent, or Firm*—Carlineo, Spicer & Kee, LLC

(57) ABSTRACT

A device for detecting a weather condition, particularly a tornado. The device includes a receiver module configured to receive electromagnetic signal from an atmosphere, particularly electromagnetic signal in the range of 1 MHz to 100 MHz. The device also includes a processing module coupled to the receiver module and configured to generate frequency spectrum data corresponding to the received electromagnetic signal, such as by performing a Fast Fourier Transform operation. Frequency spectrum data corresponding to the weather condition desired to be detected is stored in a stored data module. The device also includes a comparison module for comparing, such as by performing a cross-correlation operation, the generated frequency spectrum data and the stored frequency spectrum data in order to determine whether the weather condition is present in the atmosphere. An alarm module coupled to the comparison module generates an alarm condition when the comparison module determines that the weather condition is present in the atmosphere.

15 Claims, 2 Drawing Sheets

WEATHER WARNING SYSTEM AND METHOD

CROSS REFERENCE TO RELATED APPLICATION

This application is a continuation of U.S. patent application Ser. No. 11/588,629, filed Oct. 27, 2006, now U.S. Pat. No. 7,411,513 and entitled Weather Warning System and Method, which is a continuation of U.S. patent application Ser. No. 10/131,281, filed Apr. 22, 2002, now U.S. Pat. No. 7,202,795 and entitled Weather Warning System and Method, the entire disclosures of which are incorporated herein by reference.

FIELD OF INVENTION

The present invention relates to system and method for detecting a weather condition. More specifically, the present invention relates to a system and method for detecting tornadoes by detecting and processing the electromagnetic signal generated by a tornado.

BACKGROUND INFORMATION

A tornado poses a great danger to persons and property in its vicinity. In the United States alone, tornadoes result in tens of millions of dollars in property damage every year. In addition, tornadoes result in the deaths of numerous people every year.

One of the reasons that tornadoes are so dangerous is that they often occur very quickly and with very little discernible warning. Lives can often be saved if a person in the path of a tornado can take shelter in a relatively safe place, e.g., a basement or shelter. Thus, to minimize the loss of life, it is advantageous to provide people in the vicinity of a tornado with the earliest possible warning of the tornado, increasing the likelihood that the people will be able to take shelter in time.

It is well-known that tornadoes produce electromagnetic signals. Among the various conventional types of tornado warning systems are several approaches that seek to detect tornadoes by detecting the electromagnetic signal generated by the tornado. For instance, U.S. Pat. No. 4,684,951 to Baumer (hereinafter referred to as "Baumer") discloses a process and apparatus for monitoring weather phenomena, such as tornadoes. The apparatus of Baumer receives multi-band very low frequency ("VLF") electromagnetic radiation, i.e., 3 kHz to 100 kHz, in the atmosphere. The apparatus then splits the frequency into two bands, and compares the received frequencies with frequency values for known atmospheric events.

U.S. Pat. No. 4,023,408 to Ryan et al. (Hereinafter referred to as "Ryan et al.") discloses a storm mapping system that detects electrical disturbances generated by weather phenomena. The system of Ryan et al. receives electrical signals generated by the weather phenomena in a predetermined frequency band. The system then employs the absolute signal intensity and provides a display of the signals to an observer so as to be relative to the signal's magnitude.

U.S. Pat. No. 4,812,825 to Kennedy et al. (Hereinafter referred to as "Kennedy et al.") discloses a tornado warning system that employs a superheterodyne receiver to detect electromagnetic signal generated by a tornado. The system of Kennedy et al. is tuned to a single frequency. If a signal of this frequency is detected by the system of Kennedy et al., at a predetermined strength for a predetermined length of time, an alarm is triggered.

However, none of these tornado warning systems, nor other conventional tornado warning systems that employ the electromagnetic signal generated by a tornado, adequately detect tornadoes.

SUMMARY OF THE INVENTION

According to one embodiment, the present invention relates to a device for detecting a weather condition, particularly a tornado. The device includes a receiver module configured to receive electromagnetic signal from an atmosphere, particularly electromagnetic signal in the range of 1 MHz to 100 MHz or in one or more smaller ranges between 1 MHz to 100 MHz. The device also includes a processing module coupled to the receiver module and configured to generate frequency spectrum data corresponding to the received electromagnetic signal, such as by performing a Fast Fourier Transform operation.

Frequency spectrum data corresponding to the weather condition desired to be detected is stored in a stored data module. Advantageously, the stored frequency spectrum data includes data corresponding to the weather condition. The device also includes a comparison module for comparing, such as by performing a cross-correlation operation, the generated frequency spectrum data and the stored frequency spectrum data in order to determine whether the weather condition is present in the atmosphere. In addition, the device preferably includes an alarm module coupled to the comparison module that generates an alarm condition, e.g., a visual alarm signal and an audible alarm signal, when the comparison module determines that the weather condition is present in the atmosphere.

The device may also include an amplifier module coupled to the receiver module that is configured to amplify the received electromagnetic signal, and an analog filter module that is configured to filter the received electromagnetic signal. Furthermore, the device may include an analog-to-digital converter module that is configured to convert the signal corresponding to the analog electromagnetic signal received by the receiver module to a digital signal for eventual processing by the processing module. Various digital filters may also be employed to filter the digital signal prior to the digital signal being processed by the processing module.

DETAILED DESCRIPTION

According to various embodiments, the present invention relates to a device for detecting a tornado by novel and more sophisticated methods of: receiving and processing the electromagnetic signal generated by the tornado; storing data corresponding to a tornado; and providing an alarm condition when a tornado is detected.

Figure 1:
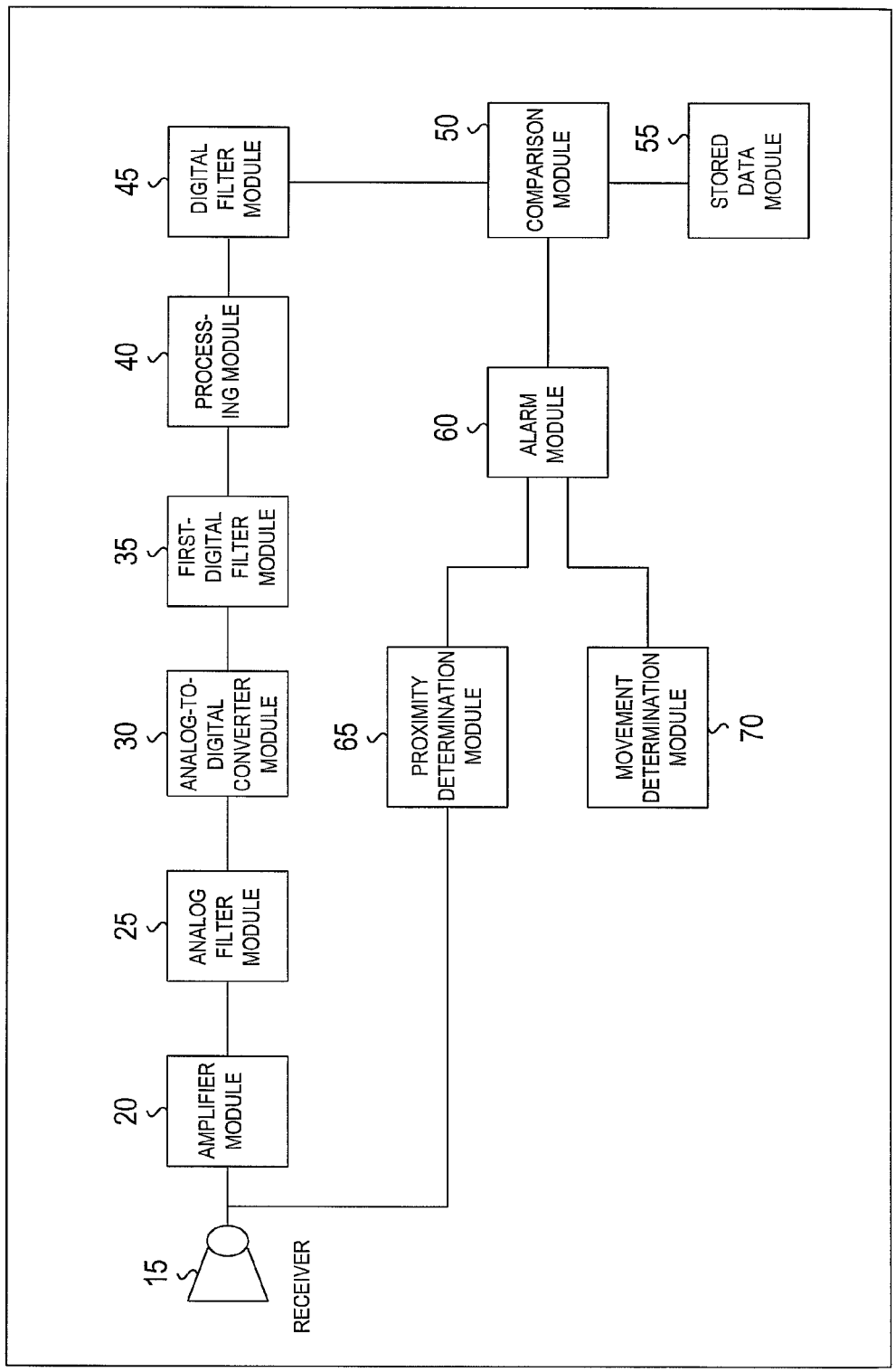
FIG. 1 is a schematic diagram that illustrates some of the components of a device for detecting a weather condition, in accordance with one embodiment of the present invention.

FIG. 1 is a schematic diagram that illustrates, according to one embodiment of the present invention, a device for detecting a weather condition. While the device is primarily intended to detect a tornado based on the electromagnetic signal generated by a tornado, it is recognized that other types of weather conditions may also generate electromagnetic signals, and the present invention is not intended to be limited to the detection of tornadoes only.

As shown in FIG. 1, the device 10 may comprise a receiver module 15. Preferably, the receiver module 15 is configured to receive all electromagnetic signal between 1 MHz and 100 MHz. Alternatively, the receiver module 15 may be configured to receive the electromagnetic signal in a smaller range between 1 MHz and 100 MHz or in multiple smaller ranges between 1 MHz and 100 MHz. According to one embodiment of the present invention, the receiver module 15 of the device 10 may be a superheterodyne receiver, which is configured to perform the three functions of carrier-frequency tuning to select a desired signal, filtering to separate the desired signal from other modulated signals, and amplification to compensate for the loss of signal power incurred in the course of transmission, some of which features are introduced as separate modules and discussed further below.

The device 10 may also comprise an amplifier module 20 coupled to the receiver module 15. The amplifier module 20 is configured to amplify the received electromagnetic signal. In addition, the device 10 may also comprise an analog filter module 25 coupled to the amplifier module 20. The analog filter module 25 is configured to filter the amplified signal.

The device 10 may also comprise an analog-to-digital converter module 30 coupled to the analog filter module 25. The analog-to-digital converter module 30 is configured to discretize the analog signal, e.g., to divide the analog signal into discrete portions that can be employed as a digital signal. A first digital filtering module 35 is coupled to the analog-to-digital converter module 30. The first digital filtering module 35 may be employed to remove noise from the signal generated by the analog-to-digital converter module 30 e.g., noise generated from broadcasting or from other sources.

The device 10 also comprises a processing module 40. The processing module 40 is configured to process the signal received by the processing module 40. Specifically, the processing module 40 is configured to generate frequency spectrum data corresponding to the signal received by the processing module 40. In a preferred embodiment, the processing module 40 is configured to generate frequency spectrum data by performing a Fourier Transform operation, such as a Fast Fourier Transform operation, on the signal received by the processing module 40. A Fourier Transform operation is an operation that converts signal in the time domain, e.g., signal corresponding to the amplitude of the electromagnetic signal received by the receiver module 15, to signal in the frequency domain. The process of performing a Fourier Transform operation is described in greater detail in Soliman, Samir and Srinath, Mandyam, *Continuous and Discrete Signals and Systems*, p. 162-210, 329-366 (Second Edition, 1998), which is incorporated by reference herein as fully as if set forth in its entirety. Generally, for a continuous-time signal, e.g., the analog signal received by the receiver module 15, the Fourier Transform of a signal x(t) is given as:

$$X(\omega)=F\{x(t)\}=\int_{-\infty}^{\infty}x(t)\exp[-j\omega t]dt$$

For a discrete-time signal, e.g., the digital signals received by the processing module 40 after the analog signal has been converted to a digital signal by the analog-to-digital signal converter 30, the Fourier Transform of a signal x(t) is given as:

$$x(\Omega) = F\{x(n)\} = \sum_{n=-\infty}^{\infty} x(n)\exp[-j\Omega n]$$

As previously mentioned, and in order to reduce the computational burden required to generate the frequency spectrum data, the processing module 40 may be configured to perform a Fast Fourier Transform operation, such as a decimation-in-time algorithm which divides an input sequence of signal values into smaller sub-sequences, or a decimation-in-frequency algorithm which divides an output sequence of signal values into smaller sub-sequences. The process of performing a Fast Fourier Transform operation is described in greater detail in Soliman, Samir and Srinath, Mandyam, *Continuous and Discrete Signals and Systems*, p. 428-435 (Second Edition, 1998), which is incorporated by reference herein as fully as if set forth in its entirety.

The device 10 may also comprise a second digital filtering module 45 coupled to the processing module 40. The second digital filtering module 45 may be configured to remove noise from the frequency spectrum data that was part of the original analog signal or that was generated by the processing module 40, e.g., noise generated from broadcasting or from other sources. The device 10 also comprises a stored data module 55. The stored data module 55 stores frequency spectrum data corresponding to a weather condition, such as frequency spectrum data corresponding to a tornado. In a preferred embodiment, the stored data module 55 stores Fast Fourier Transform data corresponding to one or more tornadoes. Alternatively, the stored data module 55 may include data corresponding to pre-determined electromagnetic signal limits.

The device 10 also comprises a comparison module 50 coupled to the second digital filter module 45 and to the stored data module 55. Alternatively, in the event that the second digital filtering module 45 is not employed, the comparison module 50 may be coupled to the processing module 40 and to the stored data module 55. The comparison module 50 is configured to compare the frequency spectrum data received by the comparison module 50 from either the second digital filter module 45 or the processing module 40 with frequency spectrum data stored in the stored data module 55. According to one embodiment of the present invention, the comparison module 50 is configured to perform a cross-correlation operation on the frequency spectrum data received by the comparison module 50. Cross-correlation is a measure of similarity between two different functions that involves "sliding" one function past another function and finding an area under the resulting product. The process of cross-correlating two functions is described in greater detail in Ambardar, Ashok, *Analog and Digital Signal Processing*, p. 156-188 (Second Edition, 1999), which is incorporated by reference herein as fully as if set forth in its entirety. Generally, the discrete cross-correlation of x[n] and h[n] is given by:

$$r_{xh}[n] = x[n] \ast\ast h[n] = \sum_{k=-\infty}^{\infty} x[k]h[k-n] = \sum_{k=-\infty}^{\infty} x[k+n]h[k]; \text{ and}$$

$$r_{hx}[n] = h[n] \ast\ast x[n] = \sum_{k=-\infty}^{\infty} h[k]x[k-n] = \sum_{k=-\infty}^{\infty} h[k+n]x[k];.$$

According to one embodiment of the present invention, the comparison module 50 is configured to perform a scaling operation before performing the comparison operation. For instance, the comparison module 50 may be configured to scale the frequency spectrum data generated by the processing module 40 or received by the comparison module 50 between the values of 0 and 1. Advantageously, the frequency spectrum data stored by the stored data module 55 is also scaled between the values of 0 and 1, although alternative embodiments may store, in stored data module 55, both scaled and unscaled frequency spectrum data. Thus, the comparison module 50 may perform the comparison operation using two sets of frequency spectrum data that are scaled between the values of 0 and 1. Alternatively, the comparison module 50 may be configured to scale the frequency spectrum data generated by the processing module 40 or received by the comparison module 50 between two values other than 0 and 1. In this embodiment, the frequency spectrum data stored by the stored data module 55 is also scaled between the same two values so that the comparison module 50 may perform the comparison operation using two sets of frequency spectrum data that are identically scaled.

The device 10 may also comprise an alarm module 60 coupled to the comparison module 50. The alarm module 60 is configured to generate an alarm condition, e.g., to provide an alarm signal, when a comparison performed by the comparison module 50 is positive. According to one embodiment of the present invention, a comparison may be positive if the comparison module 50 determines that the frequency spectrum data received by the comparison module 50 from either the second digital filter module 45 or the processing module 40 is equal to the frequency spectrum data stored in the stored data module 55. Alternatively, a comparison may be positive if the comparison module 50 determines that a difference between the frequency spectrum data received by the comparison module 50 from either the second digital filter module 45 or the processing module 40 and the frequency spectrum data stored in the stored data module 55 is within a predetermined range. According to still another embodiment of the present invention, the alarm module is configured to generate an alarm condition in accordance with any of the above described embodiments only if the condition of generating the alarm condition has a duration that equals or exceeds a predetermined length of time.

Preferably, the alarm module 60 provides either a visual alarm signal or an audible alarm signal, or both, when the alarm condition is generated. In addition, according to various embodiments of the present invention, the alarm signal generated by the alarm module 60 may be adjustable by a user, or may be switched "on" or "off" by a user. In still another embodiment of the present invention, the alarm module 60 may be configured to adjust the alarm signal so as to correspond to the results of the comparison performed by the comparison module 50. For instance, in one embodiment, the alarm module 60 may be configured to provide a loud audible alarm signal if, as determined by the comparison module 50, the generated frequency spectrum data is equal to or very similar to frequency spectrum data stored in the stored data module 55, while the alarm module 60 may be configured to provide a more quiet audible alarm signal, or none at all, if the generated frequency spectrum data is less similar to frequency spectrum data stored in the stored data module 55.

In addition, according to one embodiment of the present invention, the device 10 may also include a proximity determination module 65 coupled to the alarm module 60 and to the receiver module 15. The proximity determination module 65 is configured to determine a magnitude of the electromagnetic signal received by the receiver module 15. In addition, the proximity determination module 65 is configured to determine, based upon the magnitude of the electromagnetic signals received by the receiver module 15, the proximity of the weather condition relative to the device 10. For instance, if the proximity determination module 65 determines that the magnitude of the electromagnetic signals received by the receiver module 15 is relatively low, then the proximity determination module 65 may also determine that the weather condition is a relatively far distance from the device 10. Likewise, if the proximity determination module 65 determines that the magnitude of the electromagnetic signal received by the receiver module 15 is relatively high, then the proximity determination module 65 may also determine that the weather condition is a relatively close distance from the device 10.

According to one embodiment of the present invention, the proximity determination module 65 is coupled to the alarm module 60 so as to cause the alarm module 60 to vary its alarm signal relative to the proximity determination. For instance, if the proximity determination module 65 determines that the magnitude of the electromagnetic signal received by the receiver module 15 is relatively low, e.g., that the weather condition is relatively far away from the device 10, then the proximity determination module 65 may provide a signal to the alarm module 60 that causes the alarm module 60 to generate a relatively quiet audible alarm signal. Likewise, if the proximity determination module 65 determines that the magnitude of the electromagnetic signal received by the receiver module 15 is relatively high, e.g., that the weather condition is a relatively close distance from the device 10, then the proximity determination module 65 may provide a signal to the alarm module 60 that causes the alarm module 60 to generate a relatively loud audible alarm signal.

According to one embodiment of the present invention, the proximity determination module 65 is configured to determine the proximity of the weather condition relative to the device 10 as a function of the magnitude of the received electromagnetic signal. For instance, according to one embodiment, the magnitude of the electromagnetic signal received by the device 10 is predetermined by the proximity determination module 65 to be approximately proportional to the inverse of the square root of the distance between the weather condition and the device 10, such that upon measuring the magnitude of the received electromagnetic signal, the proximity determination module 65 determines the proximity of the weather condition in accordance therewith. According to another embodiment of the present invention, a rate of increase (or decrease) of the magnitude of the electromagnetic signal, as measured by the proximity determination module 65, is employed by the proximity determination module 65 in order to determine the proximity of, and/or the change in the proximity of, the weather condition relative to the device 10. Alternatively, the magnitude of the electromagnetic signals, as measured by the proximity determination module 65, is compared to predetermined values stored in a data storage module (not shown) of the proximity determination module 65, in order to determine the proximity of the weather condition relative to the device 10.

In another embodiment of the present invention, the device 10 may comprise a movement determination module 70 coupled to the comparison module 50. The movement determination module 70 is configured to determine a change, or a rate of change, in the frequency spectrum data corresponding to received electromagnetic signal, in order to determine a speed and/or trajectory of the weather condition. For instance, the movement determination module 70 may be configured to process frequency spectrum data corresponding to the electromagnetic signal received in a first time interval and frequency spectrum data corresponding to the electromagnetic signal received in a second, or subsequent, time interval for the purposes of determining the change, or the rate of change, in the frequency spectrum data. The frequency spectrum data that is obtained in each successive iteration may be stored, either temporarily or permanently, in the stored data module 55, in data storage modules of the comparison module 50 or the movement determination module 70, or in some other discrete data storage module (not shown). The change, or the rate of change, may be further processed in order to determine a speed and/or trajectory of the weather condition.

It should be understood that each of the modules described above may be a discrete hardware component, circuit, etc., or else may be software or any combination of hardware and software that is configured or programmed to perform the function of the module as described above. It should also be understood that each of the modules may all be integral in a single unit, or else some or all of the modules may be disposed separately and may communicate with each other via any type of conceivable communication arrangement. Furthermore, it should be understood that all or at least one of the modules described above may be integral, e.g., disposed in a single housing, with a device for performing a different, unrelated function. For instance, according to one embodiment of the present invention, the device 10 is integral with another type of alarm, such as a smoke detector/fire alarm, a carbon monoxide detector, a home security device, etc.

In operation, the device 10 of the present invention, in accordance with the embodiment shown in FIG. 1, receives via receiver module 15 all electromagnetic signal between 1 MHz and 100 MHz. Alternatively, the receiver module 15 receives an analog electromagnetic signal in a smaller range between 1 MHz and 100 MHz or in multiple smaller ranges between 1 MHz and 100 MHz. The amplifier module 20 amplifies the received analog electromagnetic signal, and the analog filter module 25 filters the amplified signal.

The analog-to-digital converter module 30 discretizes the analog signal by dividing the analog signal into discrete portions that can be employed as a digital signal. The first digital filtering module 35 filters the digital signal in order to remove noise from the signal generated by the analog-to-digital converter module 30. The processing module 40 generates frequency spectrum data corresponding to the signal received by the processing module 40. As discussed above, according to one embodiment of the present invention, the processing module 40 generates the frequency spectrum data by performing an operation such as a Discrete Fourier Transform operation or a Fast Fourier Transform operation.

The second digital filtering module 45 filters the frequency spectrum data generated by the processing module 40 in order to remove noise from the frequency spectrum data. The comparison module 50 receives frequency spectrum data from both the second digital filter module 45 and from the stored data module 55, and performs a comparison operation, such as a cross-correlation operation. Prior to the comparison operation, the comparison module 50 or another module may perform a scaling function in order to scale the frequency spectrum data received by the comparison module 50 from the second digital filter module 45 and from the stored data module 55. If a comparison performed by the comparison module 50 is positive, e.g., if the comparison module 50 determines that the frequency spectrum data received by the comparison module 50 from the second digital filter module 45 is of sufficient similarity to the frequency spectrum data stored in the stored data module 55, the alarm module 60 generates an alarm condition. According to one embodiment of the present invention, the alarm module 60 generates the alarm condition by providing an alarm signal, such as a visual alarm signal or an audible alarm signal.

Figure 2:
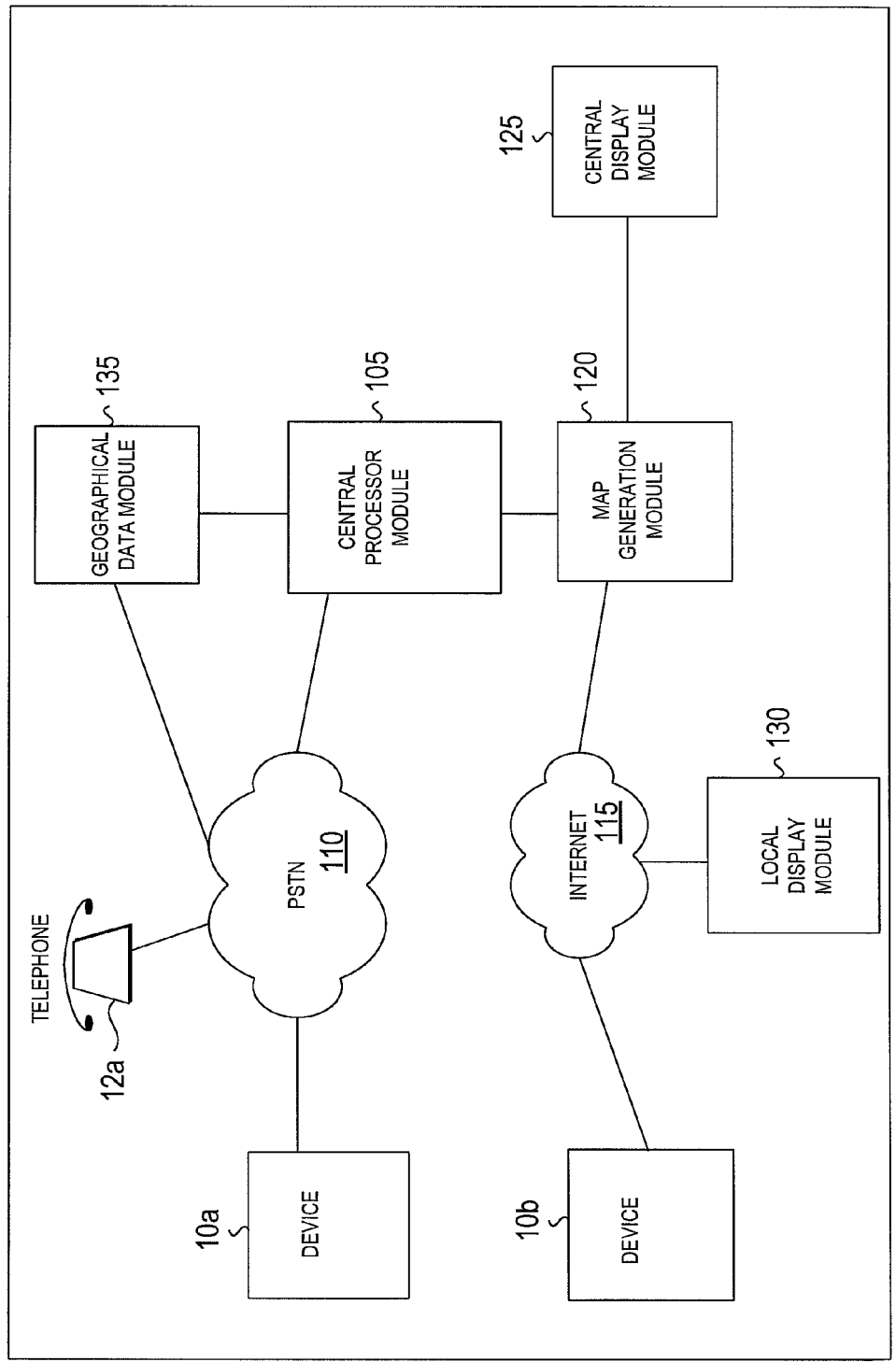
FIG. 2 is a schematic diagram that illustrates a system for detecting a weather condition, according to one embodiment of the present invention.

In an alternative embodiment, a plurality of devices, such as the device 10 described above, may be employed in a weather condition detection/warning system. FIG. 2 is a schematic diagram that illustrates a weather condition warning system 100 that employs several devices 10. For the purpose of clarity, the devices 1 Oa and 1 Ob are each shown in FIG. 2 without illustrating the features shown in FIG. 1. It should be understood that, while only two devices 10 are illustrated in FIG. 2, any number of such devices may be employed in system 100. Each of the devices 10a and 10b include a receiver module, such as receiver module 15 illustrated in FIG. 1.

The system 100 also comprises a central processor module 105. The central processor module 105 is coupled to the devices 10a and 10b by either a public-switched telephone network ("PSTN") 110 or via Internet 115, respectively. The PSTN 110 may be wired or wireless, or any combination thereof. It is noted that, while the PSTN 110 and the Internet 115 are illustrated in FIG. 2, the communication means by which the devices 10a and 10b and the central processor module 105 may communicate can be any conceivable mode of communication capable of transmitting the appropriate data therebetween. According to one embodiment of the present invention, the central processor module 105 is configured to perform a positioning function, such as by using triangulation, or a higher order or a variable order positioning algorithm.

Though not shown in FIG. 2, the system 100, according to one embodiment of the present invention, includes at least the analog-to-digital filter module, the processing module, the comparison module, the stored data module and the alarm module as illustrated in FIG. 1. However, the system 100 may be configured such that any of these modules may be located in either the device 10 or in the central processor 105. In such an embodiment, e.g., one in which one or more of the modules illustrated in FIG. 1 is located in the central processor module 105 rather than in the device 10, the system 100 is further configured to communicate the appropriate data between the modules of the device 10 and the central processor module 105 so that each of the modules receives, processes and transmits the data in the manner described above with respect to FIG. 1. Advantageously, the central processor module 105 may include modules such as the processing module 40, the comparison module 50 and the stored data module 55, thereby reducing the space and the expense required to provide such modules in each of the devices 10a and 10b.

The system 100 may also include the amplifier module, the analog filter module, the digital filter modules, the proximity determination module and the movement determination module as illustrated in FIG. 1. Again, according to various embodiments of the present invention, any or all of these modules may be located in either the devices 10a and 10b or in the central processor module 105.

The system may also include, according to one embodiment of the present invention, a map generation module 120, coupled to the central processor module 105. The map generation module 120 is configured to generate a map that shows the position of a weather condition, such as a tornado. In order to generate the map, the map generation module 120 may employ stored geographical data and user-provided location data in a manner similar to known map generation systems such as MAPQUEST.RTM. According to one embodiment of the present invention, the system 100 includes a central display module 125 coupled to the map generation module 120. Advantageously, the central display module 125 is a display screen, computer monitor or the like located at a central weather monitoring facility, such as a tornado watch facility. In this embodiment, the map generation module 120 may display on the central display module 125 a map of a particular geographical area, which may be a fixed geographical area or may be selectable by a user, as well as a representation of a weather condition determined by the system 100 to be present in the geographical area. Thus, if a central display module 120 is located in for example, Little Rock, Ark., the geographical area displayed by the central display module 120 may correspond automatically to Little Rock, Ark., and the nearby vicinity, or else may be selected by a user to correspond to other regions from which weather condition data is received.

According to another embodiment of the present invention, the system 100 may include a local display module 130 coupled via Internet 115 or by some other communication means (not shown) to the map generation module 120. Advantageously, the local display module 130 is a display screen, computer monitor or the like that is not located at a central weather monitoring facility, but may instead be located at a distance from a central weather monitoring facility, e.g., a residence or a place of business. For instance, the local display module 130 may be the monitor of a user's home computer. In this embodiment, the map generation module 120 may further to configured to generate an Internet site accessible by a remote user in order to display, on the local display module 130, a map of a particular geographical area corresponding to the local display module 130. The geographical area to be displayed on the local display module 130 may be determined by the map generation module 120 by processing data entered by the user at the local display module, e.g., the user enters a zip code in response to a user prompt. Alternatively, the geographical area to be displayed on the local display module 130 may be determined by the map generation module 120 by processing data such as a cookie generated by the user's computer when the user logs onto the Internet site associated with the map generation module 120. In addition to the map of the geographical area corresponding to the user, the map generation module 120 also displays on the local display module 130 a visual representation of the weather condition determined by the system 100 to be present in the geographical area. In order to provide a user with still more information for determining the user's proximity to the weather condition, the map generation module 120 may also be configured to generate, for display on the local display module 130, an indicator that indicates the user's location relative to the geographical area displayed. For instance, the map generation module may include an arrow or the like that provides a "You Are Here" designation. In this manner, when the system 100 determines the location of a person accessing the Internet site generated by the map generation module 120, the map generation module 120 is configured to display for the user, on the user's local display module 130, a map of the geographical area corresponding to the user's location, an indicator that indicates the user's location in the geographical area, and a visual representation of the weather condition, e.g., tornado, that indicates the weather condition's location in the geographical area.

The system 100 may also include an automated warning feature. For instance, according to one embodiment of the present invention, the central processor module 105 is configured, upon determining that a weather condition is present in a particular geographical area, to generate and transmit a warning of the weather condition to people located in the geographical area. FIG. 2 illustrates a geographical data module 135 coupled to the central processor module 105 and that may be configured, according to one embodiment of the present invention, to provide telephone numbers of persons located in one or more geographical areas. The central processor module 105 may employ these telephone numbers to generate warning telephone calls, via PSTN 110, to telephones, such as telephone 12*a*, located within the geographical area or within a predetermined distance from the geographical area. Of course, it should be understood that the central processor module 105 may be configured to provide such warnings via any conceivable means of communication, e.g., Internet, beepers, pagers, emergency broadcast system, etc., and that the present invention is not intended to be limited to the mode of communication illustrated in FIG. 2.

Thus, the present invention, according to various embodiments thereof, provides a weather condition detection system, particularly well-suited for the detection of tornadoes, that employs the unique combination of a receiver that receives all electromagnetic signal between a range, e.g., 1 MHZ to 100 MHz, that processes the signal received in order to generate a frequency spectrum, and that performs a comparison operation, e.g., a cross-correlation operation, in order to compare the frequency spectrum with frequency spectrum data corresponding to known tornado activity. Thus, unlike conventional systems that typically receive and process the signal of a single frequency, the present invention has a combination of features that receive and process a wide range of signal frequencies, in substantially continuous fashion, in order to perform a much more sophisticated analysis of the electromagnetic signals. In addition, the conventional tornado warning systems do not provide for a device that combines a proximity determination circuit, a tornado movement module, or that can be incorporated into a multi-device tornado warning system. Furthermore, the conventional tornado warning systems may not provide the affordability and portability of a device that can be incorporated into another alarm, such as a fire or smoke alarm.

Thus, the several aforementioned objects and advantages of the present invention are most effectively attained. Those skilled in the art will appreciate that numerous modifications of the exemplary embodiments described herein above may be made without departing from the spirit and scope of the invention. Although various exemplary embodiments of the present invention have been described and disclosed in detail herein, it should be understood that this invention is in no sense limited thereby and that its scope is to be determined by that of the appended claims.

We claim:

1. A method of determining a proximity of a weather condition, the method comprising:
   (a) detecting an occurrence of the weather condition by comparing frequency spectrum data corresponding to an electromagnetic signal generated by the occurrence of the weather condition with stored frequency spectrum data corresponding to one or more previous instances of the weather condition;
   (b) calculating a magnitude of the electromagnetic signal; and
   (c) determining the proximity of the occurrence of the weather condition based on the magnitude of the electromagnetic signal.

2. The method of claim 1, further comprising:
   (d) producing an alarm for a particular geographic area when the proximity of the weather condition is less than a predetermined distance from the particular geographic area.

3. The method of claim 1, further comprising:
(d) calculating a rate of change of the magnitude of the electromagnetic signal; and
(e) determining a change in the proximity of the occurrence of the weather condition from the rate of change of the magnitude of the electromagnetic signal.

4. The method of claim 3, wherein the rate of change of the magnitude of the electromagnetic signal is calculated using electromagnetic signals generated by the occurrence of the weather condition at least at one different time after the detecting in step (a).

5. The method of claim 1, wherein the proximity of the occurrence of the weather condition is determined by comparing the magnitude of the electromagnetic signal with predetermined values of magnitudes that correspond to a known measure of proximity for the weather condition.

6. A method of providing information related to a proximity of a user to an occurrence of a weather condition, the method comprising:
(a) detecting the occurrence of the weather condition in a geographic area using frequency spectrum data, wherein the frequency spectrum data corresponds to an electromagnetic signal generated by the occurrence of the weather condition; and
(b) providing a visual representation of the occurrence of the weather condition indicating the location of the occurrence of the weather condition in the geographic area.

7. The method of claim 6, further comprising:
(c) providing an indication of the location of the user in the geographic area.

8. The method of claim 7, wherein the visual representation of the occurrence of the weather condition and indication of the location of the user are displayed on a map including the geographic area.

9. The method of claim 6, wherein the geographic area is automatically determined based on processing data from a computer associated with the user.

10. The method of claim 9, wherein the geographic area is determined based on data input by the user.

11. The method of claim 6, wherein the weather condition is a tornado.

12. A system for detecting an occurrence of a weather condition, the system comprising:
a receiver for receiving an electromagnetic signal generated by the occurrence of the weather condition;
a data storage module for storing stored frequency spectrum data corresponding to one or more previous instances of the weather condition; and
a processor module for detecting the occurrence of the weather condition by comparing frequency spectrum data corresponding to the electromagnetic signal generated by the occurrence of the weather condition with the stored frequency spectrum data, calculating a magnitude of the electromagnetic signal, and determining a proximity of the occurrence of the weather condition based on the magnitude of the electromagnetic signal.

13. The system of claim 12, further comprising:
a map generation module for providing an visual representation of the weather condition indicating the location of the weather condition in a geographic area.

14. The system of claim 13, wherein the map generation module further provides an indication of the location of the user in the geographic area.

15. The system of claim 12, further comprising:
a transmitter for transmitting an indication of the occurrence of the weather condition.

* * * * *